United States Patent [19]
Lee et al.

[11] 3,864,451
[45] Feb. 4, 1975

[54] METHOD FOR REMOVING NITRIC OXIDE FROM COMBUSTION GASES

[75] Inventors: Yuan C. Lee; Jules M. Kline, both of Newport Beach, Calif.

[73] Assignee: Environics, Inc., Huntington Beach, Calif.

[22] Filed: Aug. 16, 1973

[21] Appl. No.: 281,034

[52] U.S. Cl.................. 423/239, 423/213.5, 423/244
[51] Int. Cl............................................. B01d 53/34
[58] Field of Search ........... 423/212, 213, 239, 351, 423/219, 230, 244

[56] References Cited
UNITED STATES PATENTS

| | | | |
|---|---|---|---|
| 3,429,656 | 2/1969 | Taylor et al. | 423/239 |
| 3,449,063 | 6/1969 | Griffing et al. | 423/213 |
| 3,599,427 | 8/1971 | Jones | 423/212 |

Primary Examiner—Earl C. Thomas
Attorney, Agent, or Firm—Miketta, Glenny, Poms & Smith

[57] ABSTRACT

This invention relates to a method for removing nitric oxide, in the presence of sulfur dioxide, from combustion flue gases containing nitric oxide, oxygen, carbon monoxide, carbon dioxide water vapor, unburned fuel, particulate matter, and sulfur dioxide by mixing ammonia with the flue gas, the amount of ammonia, by volume being at least equal to the volume of nitric oxide and contacting the resulting mixture of flue gas and ammonia with a catalyst selected from the group consisting of platinum group metals such as platinum, and transition metals such as vanadium, molybdenum, nickel, copper, cobalt, chromium, oxides thereof and mixtures thereof, the temperature of the catalyst being, in the case of platinum, between 525°F. and 700°F. and in the case of the other catalysts, between 500°F. and 1,000°F. The preferred support for the catalyst is a monolithic support structure, such as a corregated ceramic structure.

3 Claims, No Drawings

METHOD FOR REMOVING NITRIC OXIDE FROM COMBUSTION GASES

BACKGROUND OF THE INVENTION:

As the "smog" problem has increased in past years concern has risen for removing nitric oxide from various gases wherein nitric oxide has formed by reaction between nitrogen and oxygen. Exemplary of such gases are the flue gases of industrial burners such as steam boilers, utility gas turbines, industrial gas turbines and other power and heating plants. The reason for such concern about removing nitric oxide from gases is that nitric oxide and its product upon oxidation in the atmosphere, nitrogen dioxide, are prime irritants when present in the atmosphere.

Prior art workers have attempted to remove nitric oxide from a gaseous mixture by reducing the nitric oxide to nitrogen. Since most industrial gases contain oxygen it is necessary to have a reduction process which is selective for nitric oxide.

One approach that has been taken in the past is to utilize ammonia in the presence of a catalyst to selectively reduce nitric oxide to nitrogen and water. See, for example, U.S. Pats. Nos. 2,975,025 and 3,032,387. Both of these patents state that ammonia may be utilized to reduce nitric oxide in gases containing oxygen by mixing ammonia therewith and contacting the resulting mixture with a platinum group metal catalyst. The specific examples in both patents utilize a synthetic gas and not an actual combustion gas. Additionally, the synthetic gases do not contain sulfur dioxide which is a common constituent of an actual combustion flue gas.

We have found that there exists a rather large discrepancy between results obtained utilizing a synthetic gas mixture and actual flue gas in that results obtained utilizing a synthetic gas are not the results actually obtained when utilizing an actual combustion gas.

It is therefore an object of the present invention to disclose and provide a method for removing nitric oxide from flue gases of industrial burners, including utility steam boilers, utility gas turbines, industrial boilers, industrial furnaces, industrial gas turbines, and other plants burning low sulfur fuel, high sulfur fuel, coal, and any other fossil fuel.

A further object of the present invention is to embody a method for removing at least 50 percent and preferably 70 percent or more of nitric oxide contained in a flue gas which also contains significant amounts of sulfur dioxide.

Still a further object of the present invention is to disclose and provide a process for selectively removing nitric oxide from a combustion gas containing, inter alia, sulfur dioxide and oxygen by selectively reducing the nitric oxide to nitrogen and water by injecting ammonia into the flue gas and thereafter passing the flue gas over a suitable catalyst at a critical temperature.

Still another and further object of the present invention is to embody and provide a method for selectively reducing nitric oxide with ammonia in the presence of oxygen and sulfur dioxide by providing a catalyst on a monolithic support structure.

Another object of the present invention is to provide and disclose a practical method for selectively removing nitric oxide from flue gases at space velocities of between 10,000 and 200,000 volumes of gas per volume of catalyst per hour.

Still a further object of the present invention is to disclose and embody a practical method for preventing the pollution of our atmosphere by nitric oxide contained in flue gases and its subsequent reaction products by selectively reducing at least 50 percent, by volume, of the nitric oxide to nitrogen and water.

Summary of the Invention:

The foregoing objects and others are accomplished by the present invention which generally stated comprises injecting ammonia into a flue gas containing nitric oxide, oxygen, carbon monoxide, carbon dioxide and sulfur dioxide, water vapor and other components and contacting the resulting flue gas-ammonia mixture with a supported catalyst containing a platinum group metal, or a transition metal such as copper, cobalt, chromium, oxides thereof and mixtures thereof at a temperature of between 525°F. and 700°F., in the case of the platinum metal catalyst, and at a temperature between 500°F. and 1,000°F., in the case of the other catalysts.

We have discovered from actual tests, that in order for a method for removing nitric oxide from actual flue gases to be practical it must be able to remove 50 to 90 percent of the nitric oxide from the flue gas for a long period of time at high space velocities and in the presence of both oxygen and sulfur dioxide and other gases actually present in flue gases. The instant process will do this providing that certain critical parameters are observed.

We have found that the instant invention requires that the ammonia be present in greater than stoichiometric amounts based on the amount of nitric oxide. We have also found that in order to prevent the sulfur dioxide from poisoning the catalyst different temperatures are required than if sulfur dioxide were not present. These critical parameters will be explained in greater detail below in the preferred exemplary embodiments.

Description of the Preferred Embodiments:

In the present invention, the theoretical reaction between nitric oxide and ammonia is as follows:

$$6\ NO + 4\ NH_3 \rightarrow 5\ N_2 + 6\ H_2O$$

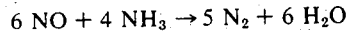

It can be seen that if the reaction between ammonia and nitric oxide was completely selective the volume of ammonia required for complete reaction with nitric oxide would be less than the amount of nitric oxide present in the gas. However, we have found that, in fact, the volume of ammonia should at least be equal to that of the nitric oxide present in the flue gas and, preferably, (particularly when operating at high space velocities) the volume of ammonia should be at least twice that of the nitric oxide present. We have also discovered that if the volume of ammonia is much more than twice that of the nitric oxide present the reduction of nitric oxide is the same regardless of how much greater the ammonia concentration is relative to the nitric oxide present. Therefore, in the interest of economics it is readily apparent that it is desirable if the volume of ammonia be about twice that of the nitric oxide present though no detrimental effects in the removal efficiency of the nitric oxide is seen if the ammonia concentration is raised to, for example, four times that of the nitric oxide present. However, in order to reduce the amount of ammonia in the exit gas it is sometimes desirable to sacrifice removal efficiency of the nitric oxide and therefore it is sometimes preferred to operate with concentrations of ammonia equal to that of nitric oxide or slightly greater.

When we speak of removal efficiency we mean the percentage of nitric oxide in the combustion gas which is removed by a passage over the catalyst bed. This can be calculated as follows: subtract the nitric oxide concentration in the exit gas from the nitric oxide concentration inlet gas, multiply by 100, and divide by the nitric oxide concentration in the inlet gas. Similarly, space velocity is the quantity of gas, in standard cubic feet, which is passed over one cubic foot of catalyst per hour. Higher values of space velocity indicate that a given gas flow rate can be treated with a smaller catalyst bed or, in the alternative, a given catalyst bed can be utilized to treat greater volumes of gas.

Inasmuch as most industrial gases and certainly all flue gases contain oxygen in varying amounts, i.e. usually at least 1.5 percent, by volume of oxygen, it is necessary that the removal efficiency not adversely be affected by oxygen concentration and, similarly, that the amount of ammonia needed not be greatly increased by oxygen concentration. We have found that not only does the presence of oxygen in the flue gas in amounts of from 1 percent to as high as 20 percent, by volume, not adversely affect the removal efficiency but when the oxygen concentration is present in excess of 0.5 percent, by volume, the removal efficiency at a given temperature and space velocity is actually increased. Apparently, oxygen promotes the nitric oxide-ammonia reaction.

Another critical parameter present in the instant invention is the temperature utilized when the mixture of the flue gas and ammonia contact the catalyst. When sulfur dioxide is present, we have found, for example, in the case of platinum, that different temperatures are necessary for removal efficiencies of 70 percent or more when compared to temperatures utilized when no sulfur dioxide is present. For example, when operating with no sulfur dioxide present we have found that we have removal efficiencies of 90 percent or greater in the 400° to 500°F. range. However, when sulfur dioxide is present in an amounts of 10 parts per million or greater (e.g. 30 parts per million or greater) the removal efficiency is vastly reduced at temperatures of between 400°F. and 500°F. after only a few hours. For example, in most cases, the removal efficiency drops, at these temperatures, from 90% or greater to less than 60 percent, and, in some instances, to as little as 40%. In contrast thereto, when the temperature is raised to between 525°F. and 700°F. (preferably between 550°F. and 600°F. or 650°F.) it is found that even after 500 hours exposure to gases containing 10 to 300 parts per million of sulfur dioxide the removal efficiency remains steady at around 80 to 90 percent. However, if no sulfur dioxide were present in the gas and a temperature of 600°F. were utilized as the catalyst contact temperature the removal efficiency would drop to as low as 40 or 50 percent depending upon the concentration of ammonia. We have observed the same phenomenon with respect to the other catalysts of this invention except that the temperature of the catalyst at the time it contacts the gas-ammonia mixture should be between 500° and 1,000°F.

Inasmuch as a practical process for removing nitric oxide from industrial flue gases must operate at space velocities of upwards of 50,000 the presently preferred support for the catalyst of this invention is a monolithic support structure. We have found, for example, with a honeycomb support, that the process of the present invention can operate at space velocities of 100,000 and even as high as 200,000. At these space velocities there is a distinct possibility of a large pressure drop. For example, flow rates of a flue gas from a 480 megawatt boiler approaches $50 \times 10^6$ SCFH. Consequently, the catalyst of this invention must be capable of imposing a low pressure drop while operating at space velocities in the range of 10,000 to 200,000 V/V/hr. (i.e., limiting catalyst volume to between 250 and 5,000 cubic feet). Catalyst support configuration is a very important factor in minimizing this pressure drop; a monolithic support structure produces a pressure drop approximately one order of magnitude lower than a pellet support.

Presently preferred supports for the catalyst are honeycomb and corregated ceramic supports having 11 to 12 cells per inch and 8 cells per inch, particularly for the platinum catalyst. It is also generally preferred if the platinum catalyst has a wash coat of, for example, gamma-alumina, which is preferred because of its high intrinsic surface area. However, other wash coats can be utilized such as silica and mullite. Additionally, U.S. Pats. Nos. 3,444,925 and 2,552,937 both disclose honeycomb supports which are useful in the present invention for supporting the catalyst.

Other suitable catalyst supports are those which are in the form of small pellets or tablets which may be alumina, silica, silica gel, diatomaceous earth, aluminum hydroxide, activated carbon, etc. The amount of catalyst present on the support is not critical and can vary in wide ranges but, in the case of platinum, it is preferred if the catalyst is present in an amount of from 0.01 to 10 percent.

In the case of the transition metal catalysts, such as nickel, copper, copper oxide, cobalt oxide or mixture thereof, the amount of catalyst on the support may vary from as little as 1 percent, by weight, to as high as 100 percent when, for example, a mixture of cobalt oxide and copper oxide or a mixture of copper and nickel are made into a monolithic structure.

As has been noted above, we have found that there are certain critical parameters involved in this invention which is due, in large part, to the presence of sulfur dioxide and other compounds normally found in commercial combustion gases.

In a typical flue gas one will find about 73 percent nitrogen, 2 percent oxygen, 13 percent carbon dioxide, 12 percent water vapor, 200 to 300 parts per million of nitric oxide and 5 to 3000 parts per million of sulfur dioxide. The remainder of the gas will be composed of a minor amount of sulfur trioxide, nitrogen dioxide and particulate matter.

Utilizing a furnace flue gas having a nitric oxide content of 225 parts per million, an oxygen content of 2%, and 30 parts per million of sulfur dioxide, we can reduce the nitric oxide by 80 percent (at a space velocity of 50,000 V/V/hr.) by utilizing a temperature of 550°F., 600 parts per million of ammonia, and a platinum catalyst on a honeycomb ceramic support (about 0.3 percent platinum). The 80 percent reduction remained steady for a period of 240 hours. In contrast thereto, at a temperature of 500°F., under identical conditions, the initial reduction in nitric oxide was about 90 percent but rapidly fell to 60 percent.

In another experiment of a gas containing 100 parts per million of sulfur dioxide, about 225 parts per million of nitric oxide and about 2% oxygen, we reduced the nitric oxide content of the exit gas by 90% utilizing a platinum catalyst on a honeycomb support, a space velocity of 50,000 V/V/hr., 450 parts per million of ammonia, with the temperature of the catalyst being about 550°F., for a period of over 200 hours.

In another test utilizing the exact same gas except it contains 300 parts per million of sulfur dioxide and the same conditions except that the temperature was 575°F. and the amount of ammonia utilized was 450 parts per million, we reduced the nitric oxide content of the exit gas by about 80 percent for 500 hours.

When the identical gas is utilized except that no sulfur dioxide is present we have found that at 420°F., utilizing 350 parts per million of ammonia, the reduction in nitric oxide is about 98 percent but when the temperature is raised to around 550°F. the nitric oxide reduction falls off drastically to say 60 percent or less.

To show the same results as above utilizing a transition metal catalyst (a mixture of 62 percent copper oxide, 5 percent cobalt oxide, and 33 percent aluminum hydroxide), a flue gas containing 220 parts per million of nitric oxide, 2.5 percent oxygen, 73 percent nitrogen, 12 percent water vapor, 12 percent carbon dioxide, a minor amount of carbon monoxide, and 300 parts per million of sulfur dioxide was passed through the catalyst at a temperature of 800°F. at a space velocity of 25,000 V/V/hr. after mixing with 400 parts per million of ammonia. The nitric oxide content of the exit gas was reduced by about 60 to 65 percent for 200 hours.

In the preferred exemplary embodiments given above, certain space velocities, temperatures, catalysts, etc. were given. However, this was done for the purpose of exemplification and the exemplary embodimets are not to be considered limiting since many alterations and substitutions will be apparent to those skilled in the art which come within the spirit and scope of the present invention.

We claim:

1. A method for selectively removing nitric oxide in the presence of sulfur dioxide from a flue gas containing nitric oxide, oxygen, carbon monoxide, carbon dioxide, water vapor and between 10 parts per million and 300 parts per million of sulfur dioxide, which comprises: mixing ammonia with said flue gas, the amount of ammonia, by volume, being at least equal to the volume of nitric oxide, and contacting the resulting mixture of flue gas and ammonia with a platinum catalyst on a support at a temperature between about 550°F and 600°F.

2. A method according to claim 1 wherein the platinum catalyst is on a monolithic support structure.

3. A method according to claim 1 wherein the space velocity is between 10,000 V/V/hr. and 200,000 V/V/hr.